United States Patent
Henderson

(10) Patent No.: US 8,625,577 B1
(45) Date of Patent: Jan. 7, 2014

(54) METHOD AND APPARATUS FOR PROVIDING AUDIO RECORDING

(75) Inventor: Donnie Henderson, Manalapan, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1513 days.

(21) Appl. No.: 11/292,231

(22) Filed: Nov. 30, 2005

(51) Int. Cl.
*H04M 1/64* (2006.01)
*H04M 3/42* (2006.01)

(52) U.S. Cl.
USPC .......... 370/352; 379/75; 379/85; 379/207.01; 455/417

(58) Field of Classification Search
USPC .......... 370/252, 352; 379/207.01, 75, 35, 85; 455/417
See application file for complete search history.

(56) References Cited

U.S. PATENT DOCUMENTS

| | | | | |
|---|---|---|---|---|
| 5,740,543 A * | 4/1998 | Maeda | ...................... | 455/550.1 |
| 6,671,353 B1 * | 12/2003 | Goh | ........................... | 379/67.1 |
| 2002/0067810 A1 * | 6/2002 | Barak et al. | ................. | 379/88.25 |
| 2002/0118798 A1 * | 8/2002 | Langhart et al. | ............. | 379/67.1 |
| 2004/0131161 A1 * | 7/2004 | Schwartz et al. | ................ | 379/68 |
| 2005/0226395 A1 * | 10/2005 | Benco et al. | ..................... | 379/85 |
| 2008/0159509 A1 * | 7/2008 | Whitfield et al. | ........ | 379/202.01 |

* cited by examiner

*Primary Examiner* — Nicholas Jensen

(57) ABSTRACT

A method and apparatus for enabling a packet network based service feature to record verbal notes or other spoken (or even artificially generated audio) information on behalf of a subscriber while in a conversation are disclosed. In one embodiment, the present method allows a subscriber to effectively self-record or verbally transcribe desired portions of a conversation without the fear of privacy invasion.

9 Claims, 4 Drawing Sheets

METHOD AND APPARATUS FOR PROVIDING AUDIO RECORDING

The present invention relates generally to communication networks and, more particularly, to a method and apparatus for providing conversation information recording in packet networks, e.g., Voice over Internet Protocol (VoIP) networks.

BACKGROUND OF THE INVENTION

Very often, a subscriber wishes to record real-time conversational information or verbal notes while in conversation with another party on the phone in a non-privacy intrusive fashion. Legally, the subscriber cannot record the conversation of the other party without permission of the other party, but sometimes the other party provides useful verbal information to the subscriber and the subscriber cannot write down the information fast enough. It will be extremely useful if the subscriber can simply repeat the given information or add any additional information verbally and save it within the network for later retrieval.

Therefore, a need exists for a method and apparatus for enabling conversation information recording in a packet network, e.g., a VoIP network.

SUMMARY OF THE INVENTION

In one embodiment, the present invention enables a packet network based service feature, e.g., a VoIP network based service feature, to record verbal notes or other spoken (or even artificially generated audio) information on behalf of a subscriber while in a conversation. The present invention allows a subscriber to effectively self-record or verbally transcribe desired portions of a conversation without the fear of privacy invasion or legal complication associated with recording a conversation without the consent of the other party. Namely, the recording only comprises verbal notes or other spoken (or even artificially generated audio or other external or ambient audio) information of the subscriber and not the other party. Such a service feature would be extremely useful and service differentiating and can be effectively implemented in a packet network, e.g., a Voice over IP (VoIP) infrastructure.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
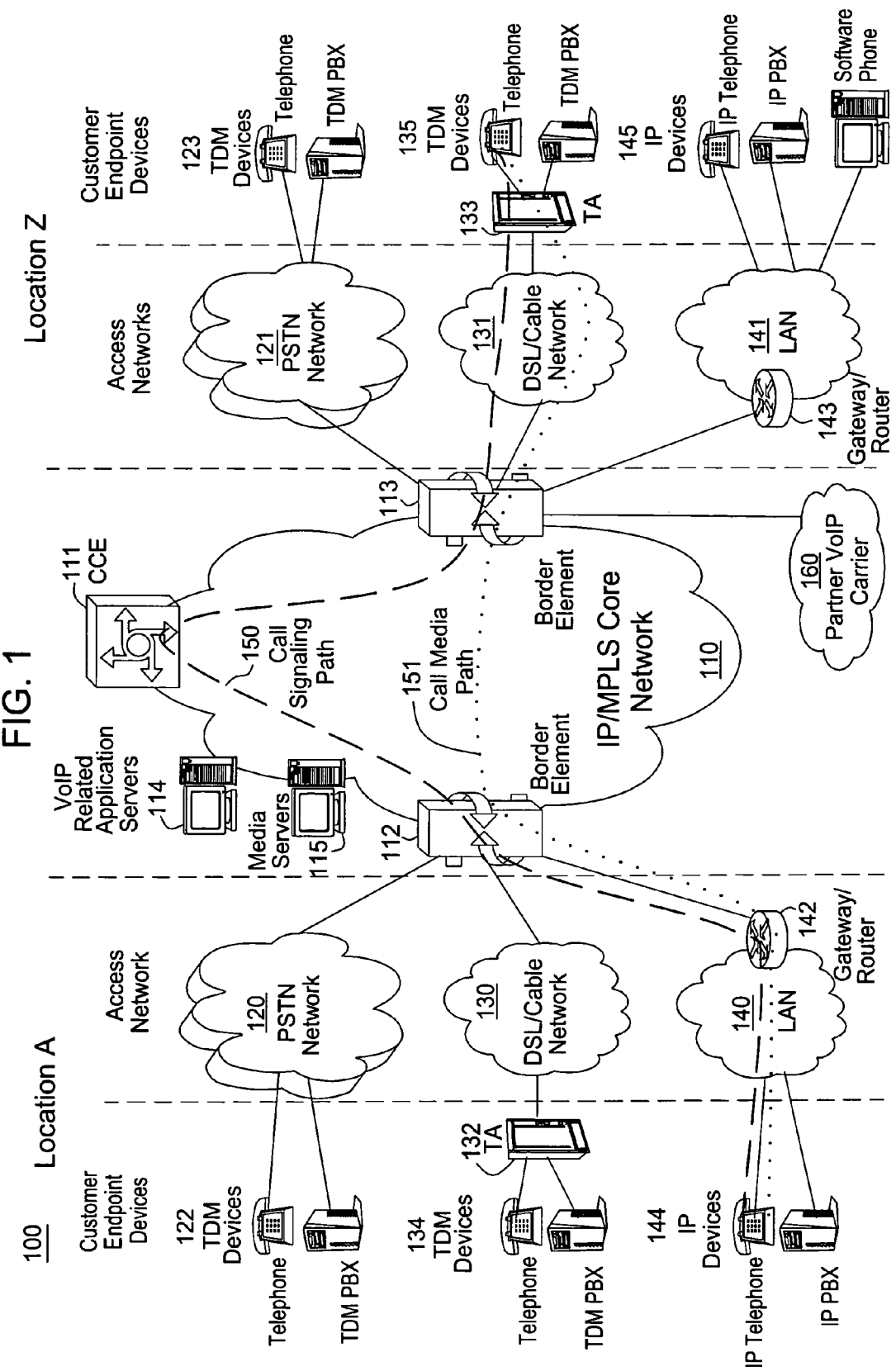
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones, software phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Very often, a subscriber wishes to record real-time conversational information or verbal notes while in conversation with another party on the phone in a non-privacy intrusive fashion, and in a fashion that does not interfere with the conversation substantially. Legally, the subscriber cannot record the conversation of the other party without permission of the other party, but sometimes the other party provides useful verbal information to the subscriber and the subscriber cannot write down the information fast enough. It will be extremely useful if the subscriber can simply repeat the given information or add any additional information verbally and save it within the network for later retrieval.

To address this need, the present invention enables a packet network, e.g., a VoIP network based service feature to record verbal notes or other spoken (or even artificially generated audio) information on behalf of a subscriber while in a conversation. The present invention allows a subscriber to effectively self-record or verbally transcribe desired portions of a conversation without the fear of privacy invasion or legal complication associated with recording a conversation without the consent of the other party. Such a service feature would be extremely useful and service differentiating and can be effectively implemented in a packet network, e.g., a VoIP infrastructure.

Consider the scenario that, while on a live call, a subscriber wants to be able to record audio notes to oneself. This allows the subscriber to capture information from another call party without actually recording the conversation of the other party. For instance, while on a call, a subscriber can use a pre-defined Dual Tone Multiple Frequency (DTMF) sequence, or some other signaling including, but is not limited to, a dedicated button or a pre-defined speech command, that causes only the subscriber's spoken input to be recorded. The present invention can be considered a specialized audio notepad type function. For instance, a subscriber has subscribed to this service feature and enabled it on the subscriber's phone service. The subscriber is on a call using a mobile phone. The other call party is about to give the subscriber driving directions. The subscriber simply keys in a pre-defined DTMF sequence or a dedicated special button on the phone. This action engages the recording function in the VoIP network for this call. In one embodiment, the subscriber's spoken input is now routed directly to a recording element, and not to the other call party. Now as the other call party speaks, the subscriber simply listens and dictates to the phone repeating the directions and adding other verbal information or other audio input as desired. The subscriber can terminate the recording via another DTMF sequence or a dedicated special button on the phone.

After the subscriber finishes the phone call, the subscriber can call the recording element storage system using a pre-defined phone number, or other subscriber dial in feature or interface provided by the VoIP service provider to retrieve the recorded audio notes. Alternatively, the subscriber can use the Internet to login to a website that allows the subscriber to access and retrieve the recorded audio notes. Moreover, the network provider can even provide the option to the subscriber to configure an email address to which the recorded audio notes will be sent to automatically. A service might include recording statistics and resource usage information in such recording related messages sent to the subscriber.

In an alternative embodiment, the subscriber's speech or audio notes while being recorded can also be transmitted to the other party. This implementation offers the advantage that it will maintain the two way nature of the conversation, while the recording is taking place. However, if the subscriber is also making additional audio notes, such audio notes will be heard by the other party which may not be desirable in some instances.

Figure 2:
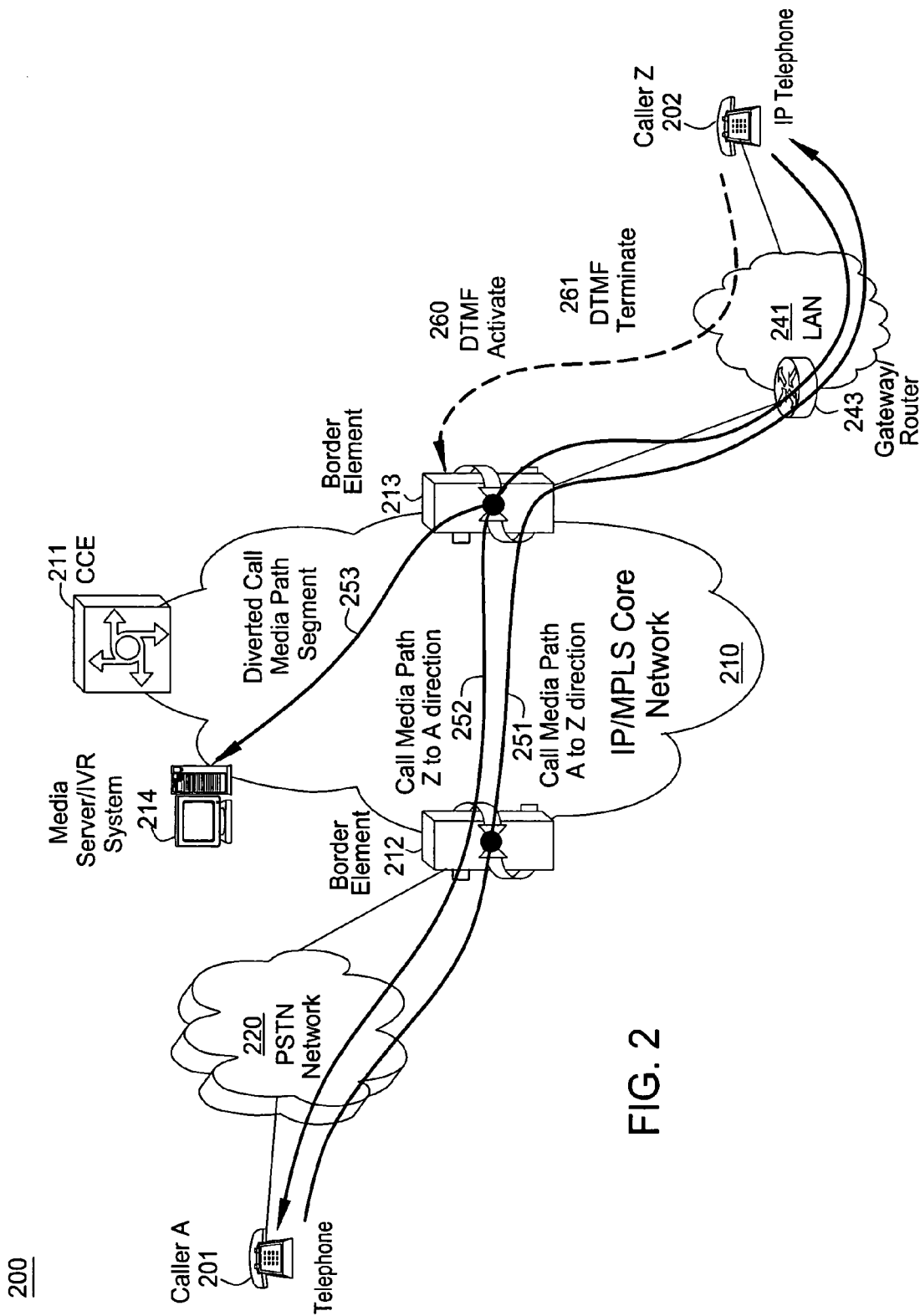
FIG. 2 illustrates an example of the network based audio notes self-recording service feature of the present invention.

FIG. 2 illustrates an example of the network based audio notes self-recording service feature of the present invention. In FIG. 2, a caller A (e.g., a call party), 201, and caller Z, 202, are engaged in an ongoing call. Call media path 251 shows the A to Z direction of the existing call connection. Call media path 252 shows the Z to A direction of the existing call connection. Caller Z is a subscriber of the network based audio notes self-recording service feature. During the conversation, caller Z would like to self-record some information provided by caller A. While caller A is providing the information, caller Z enters a pre-defined DTMF sequence 260 to activate the self-record service feature. Upon receiving the pre-defined DTMF sequence 260, BE 213 processes the service feature activation signal and diverts the Z to A direction call media path 252 from BE 213 to Media Server/IVR (Interactive Voice Response) System 214 using the modified call media path segment 253. In one embodiment, the call media path segment from BE 213 to Caller A, 201, in the direction from Z to A has now been placed on hold. Media Server/IVR System 214 records the incoming audio notes (broadly defined as media information) from caller Z and stores them for later retrieval by caller Z. A Media Server (MS) is a special server that typically handles and terminates media streams, and to provide services such as announcements, bridges, transcoding, and Interactive Voice Response (IVR) messages. Because the active Z to A direction call media path has been diverted by BE 213, the audio notes being recorded by the network cannot be heard by caller A at all; however, the A to Z direction call media path remains active and caller Z continues to hear the conversation from caller A. When caller Z finishes dictating the audio notes, caller Z enters another pre-defined DTMF sequence 261 to terminate the self-record service feature. Upon receiving the pre-defined DTMF sequence 261, BE 213 processes the service feature termination signal and reverts the modified Z to A direction call media path to the original Z to A direction call media path 252. After the call is finished, caller Z can call to access Media Server/IVR System 214, or use the Internet to login to Media Server/IVR System 214 to retrieve the recorded audio notes. Caller Z also has the option to configure an email address to which recorded audio notes will be emailed by Media Server/IVR System 214 to the caller Z automatically.

Figure 3:
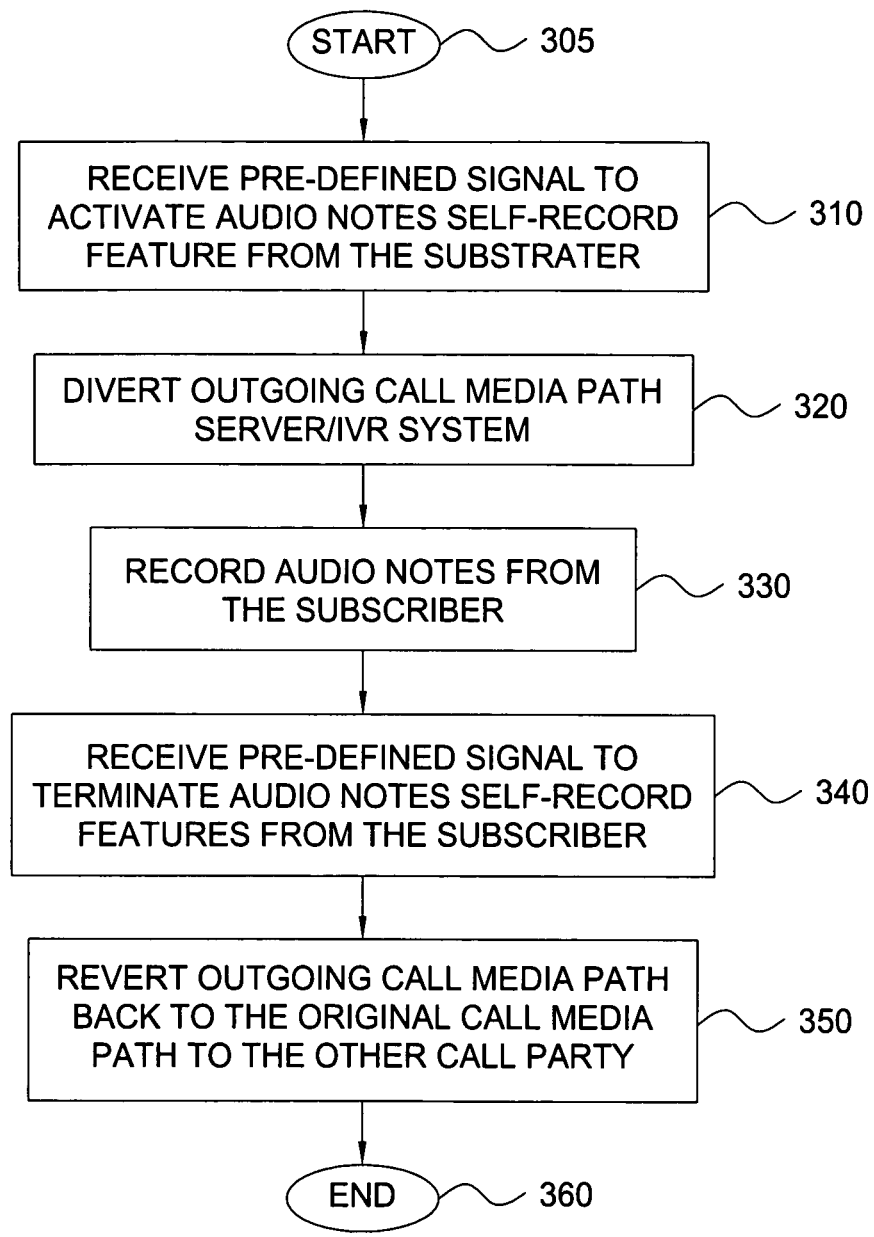
FIG. 3 illustrates a flowchart of a method for enabling conversation information recording in a VoIP network of the present invention.

FIG. 3 illustrates a flowchart of an exemplary method for enabling conversation information recording in a packet network, e.g., a VoIP network of the present invention. Method 300 starts in step 305 and proceeds to step 310.

In step 310, the method receives from the subscriber a pre-defined signal to activate the audio notes self-record feature. The pre-defined signal can be, but is not limited to, a specific DTMF sequence defined by the network provider or a specific voice command spoken by the subscriber.

In step 320, the method diverts the outgoing media path of the subscriber to the Media Server/IVR System. In one embodiment, the call media path is diverted by the edge component of the VoIP network associated with the subscriber's endpoint, such as a BE that serves as a VoIP network gateway or an IP gateway.

In step 330, the method records the audio notes from the subscriber. For example, the audio notes are recorded by a Media Server/IVR System.

In step 340, the method receives from the subscriber a pre-defined signal to terminate the audio notes self-record feature. The pre-defined signal can be, but is not limited to, a specific DTMF sequence defined by the network provider or a specific voice command spoken by the subscriber.

In step 350, the method reverts the outgoing call media path back to the original call media path to the other call party. The method ends in step 360.

Figure 4:
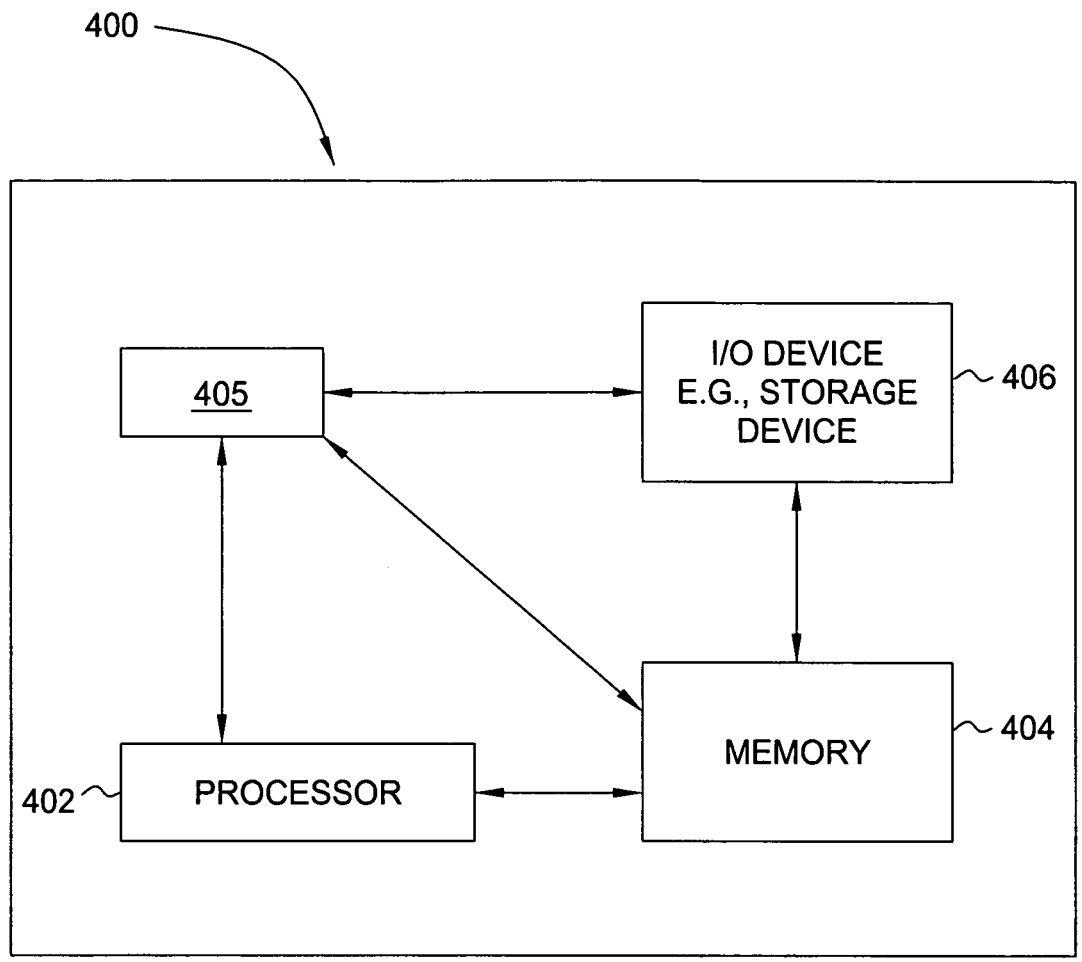
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a Conversation Information Recording module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present Conversation Information Recording module or process 405 can be loaded into memory 404 and executed by processor 402 to implement the functions as discussed above. As such, the present Conversation Information Recording process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for recording audio information of a subscriber during a call in a communication network, comprising:

establishing the call between an endpoint device of the subscriber and an endpoint device of a call party, wherein the call comprises the audio information of the subscriber and audio information of the call party, wherein the call is established by a border element of the communication network, wherein the communication network comprises a service provider infrastructure;

receiving, by the border element, a first signal from the endpoint device of the subscriber to record the call, wherein the first signal is a first predefined voice command;

diverting, by the border element, a call media path in a direction from the endpoint device of the subscriber toward the communication network to a recording element within the communication network in response to receiving the first signal; and recording, by the recording element within the communication network, only the audio information of the subscriber during the call while preventing the endpoint device of the call party from receiving the audio information of the subscriber, wherein the endpoint device of the subscriber continues to receive the audio information of the call party on the call during the recording, wherein the recording element is distinct from the endpoint device of the subscriber and from the endpoint device of the call party, wherein the recording element is an interactive voice response system, wherein the recording comprises:

storing the audio information from the subscriber by the recording element;

receiving a second signal from the endpoint device of the subscriber to stop recording the call, wherein the second signal is a second predefined voice command; and reverting the call media path back to an original call media path.

2. The method of claim 1, wherein the communication network is an internet protocol network.

3. The method of claim 1, wherein the audio information recording is stored by the recording element indexed by a time and a date.

4. The method of claim 1, further comprising:
forwarding the audio information that is recorded to the subscriber via an email.

5. A computer-readable non-transitory medium storing instructions which, when executed by a processor of a border element in a communication network, cause the processor to perform operations for recording audio information of a subscriber during a call in the communication network, the operations comprising:
establishing the call between an endpoint device of the subscriber and an endpoint device of a call party, wherein the call comprises the audio information of the subscriber and audio information of the call party;
receiving a first signal from the endpoint device of the subscriber to record
the call, wherein the first signal is a predefined voice command;
diverting a call media path in a direction from the endpoint device of the subscriber toward the communication network to a recording element within the communication network in response to receiving the first signal, wherein the communication network comprises a service provider infrastructure, wherein the recording element is for recording only the audio information of the subscriber during the call while preventing the endpoint device of the call party from receiving the audio information of the subscriber, wherein the endpoint device of the subscriber continues to receive the audio information of the call party on the call during the recording, wherein the recording element is distinct from the endpoint device of the subscriber and from the endpoint device of the call party, wherein the recording element is an interactive voice response system, wherein the recording comprises storing the audio information from the subscriber by the recording element;
receiving a second signal from the endpoint device of the subscriber to stop recording the call, wherein the second signal is a second predefined voice command; and
reverting the call media path back to an original call media path.

6. The computer-readable non-transitory medium of claim 5, wherein the communication network is an internet protocol network.

7. The computer-readable non-transitory medium of claim 5, wherein the audio information recording is stored by the recording element indexed by a time and a date.

8. The computer-readable non-transitory medium of claim 5, further comprising:
forwarding the audio information that is recorded to the subscriber via an email.

9. A system for recording audio information of a subscriber during a call in a communication network, comprising:
a call control element for establishing the call between an endpoint device of the subscriber and an endpoint device of a call party, wherein the call comprises the audio information of the subscriber and audio information of the call party;
a border element for receiving a first signal from the endpoint device of the subscriber to record the call, wherein the first signal is a predefined voice command, and for diverting a call media path in a direction from the endpoint device of the subscriber toward the communication network to a recording element within the communication network in response to receiving the first signal, wherein the communication network comprises a service provider infrastructure; and
the recording element within the communication network for recording only the audio information of the subscriber during the call while preventing the endpoint device of the call party from receiving the audio information of the subscriber, wherein endpoint device of the subscriber continues to receive the audio information of the call party on the call during the recording, wherein the recording element is distinct from the endpoint device of the subscriber and from the endpoint device of the call party, wherein the recording element is an interactive voice response system, wherein the recording comprises:
storing the audio information from the subscriber by the recording element;
receiving a second signal from the endpoint device of the subscriber to stop recording the call, wherein the second signal is a second predefined voice command; and
reverting the call media path back to an original call media path.

* * * * *